(12) United States Patent
Mishina et al.

(10) Patent No.: US 7,360,088 B2
(45) Date of Patent: Apr. 15, 2008

(54) METHOD AND SYSTEM FOR AUTHENTICATING SERVICE USING INTEGRATED CIRCUIT CARD

(75) Inventors: Yusuke Mishina, Kunitachi (JP); Akiko Sato, Musashino (JP); Masanori Oikawa, Koganei (JP)

(73) Assignee: Hitachi, Ltd., Tokyo (JP)

( * ) Notice: Subject to any disclaimer, the term of this patent is extended or adjusted under 35 U.S.C. 154(b) by 639 days.

(21) Appl. No.: 10/869,871

(22) Filed: Jun. 18, 2004

(65) Prior Publication Data

US 2005/0076212 A1 Apr. 7, 2005

(30) Foreign Application Priority Data

Oct. 6, 2003 (JP) .............................. 2003-346520

(51) Int. Cl.
*H04L 9/00* (2006.01)
(52) U.S. Cl. ...................... 713/168; 713/169; 713/189; 713/193; 380/229; 726/2; 726/21; 726/30; 705/51; 705/67
(58) Field of Classification Search ........ 713/168–169, 713/189, 193; 726/2, 21, 30; 380/229; 705/51, 705/67
See application file for complete search history.

(56) References Cited

U.S. PATENT DOCUMENTS 5,534,857 A * 7/1996 Laing et al. ............... 340/5.74
6,105,008 A * 8/2000 Davis et al. ................. 705/41
2003/0105969 A1 6/2003 Matsui et al.
2004/0250066 A1* 12/2004 Di Luoffo et al. ......... 713/168

FOREIGN PATENT DOCUMENTS

| JP | 10-143695 | 11/1996 |
|---|---|---|
| JP | 10-293867 | 4/1997 |
| JP | 2002-324213 | 4/2001 |
| JP | 2003-203207 | 1/2002 |

* cited by examiner

*Primary Examiner*—Kim Vu
*Assistant Examiner*—Baotran N. To
(74) *Attorney, Agent, or Firm*—Reed Smith LLP; Stanley P. Fisher, Esq.; Juan Carlos A. Marquez, Esq.

(57) ABSTRACT

A system is provided which compensates a low operational performance of a conventional integrated circuit (IC) card by setting a substitute server computer between the IC card and a business server computer in a system using the IC card. Substitute processing using an authentication result is realized by setting an IC card authentication server computer in addition to the business server computer and sending an authentication result of the authentication server computer to the IC card, substitute server computer, and business server computer. Thus, because the substitute server computer does not directly authenticate the IC card, the quantity of authentication information in the substitute server computer is substantially reduced and authentication processing becomes efficient.

12 Claims, 7 Drawing Sheets

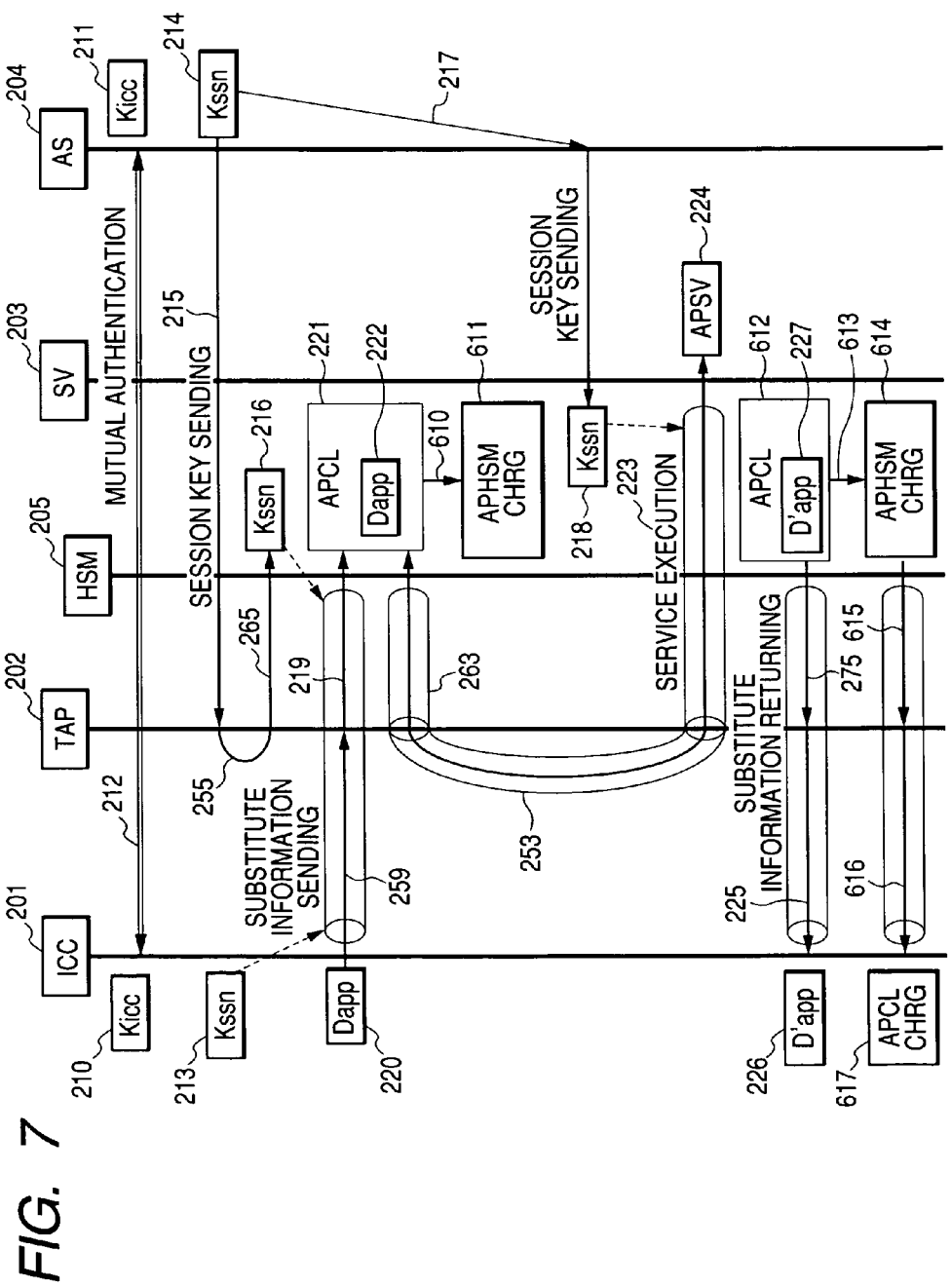

METHOD AND SYSTEM FOR AUTHENTICATING SERVICE USING INTEGRATED CIRCUIT CARD

CLAIM OF PRIORITY

The present invention claims priority from Japanese application JP 2003-346520 filed on Oct. 6, 2003, the content of which is hereby incorporated by reference in its entirety.

BACKGROUND OF THE INVENTION

1. Field of the Invention

The present invention relates to authenticating a service using an integrated circuit (IC) card and, more particularly, to increasing security in the process of authenticating a service using an IC card.

2. Background of the Invention

Because an IC card can record a large quantity of information and has an advanced security, it has become in recent years a substitute information recording medium for a magnetic card. The IC card is expected to be increasingly applied to the financial field, as a credit card and as electronic money, while making better use of advanced security of the IC card.

An IC card is a memory card or microprocessor card generally composed of a CPU, memory, and communication processing section. A memory card represented by a card conforming to ISO 7816 or a card conforming to JICSAP is an IC card in which data can be only written and which is used as a file. A microprocessor card represented by a Java (registered trademark) card specification or MULTOS specification is an IC card which mounts a program and can execute it.

To execute business processing while considering security in a system using an IC card, a method has been used which executes business processing after executing mutual authentication between an IC card and a host computer and establishing a safe communication path (secure channel) between the IC card and the host computer. Specifically, such a method realizes mutual authentication by sharing the secret information for executing mutual authentication between the IC card and a server computer and confirming the shared secret information.

JP-A No. 293867/1998 (Patent Document 1) discloses a technique for using a memory card allowing radio communication, reading data from the memory card through an automatic ticket gate when getting on/off a train, processing the data, and returning the data to the memory card.

Moreover, there is a technique referred to as an HSM (hardware security module). The HSM is a device for detecting a change of temperatures or atmospheric pressures and physically protecting the secrecy of a cipher module by a mechanism in which the data in the device disappears when the mechanism is disassembled or impacted. Furthermore, to attack the HSM, the HSM generates and keeps a secret key of the CA (Certificate Authority) and keeps a signature operation and the secret key of a user. When performing these operations in a computer, there are risks such as damage to the computer, and theft or illegal copying of a key due to unfair invasion. Thus, the reliability of a certificate or the like is lost. FIPS PUB (Federal Information Processing Standard Publication) in the United States sets the standard for tamper-resistant criterion.

As a technique using an HSM, JP-A No. 203207/2003 (Patent Document 2) discloses that a personal computer in a member's store executes data exchange with a credit card company through a communication section and an external communication line while securing security by using an HSM 20.

As a technique for using a kiosk terminal which can be accessed to read or write data from or in a storage medium such as an IC card of a user, JP-A No. 324213/2002 (Patent Document 3) discloses a technique for the kiosk terminal to install an application program into the IC card.

As a technique for compensating the numerical ability and communication speed of an IC card, JP-A No. 143695/1998 (Patent Document 4) discloses a technique for an in-vehicle unit to substitute for an IC card for a traffic-charge receiving system of a turnpike.

Examples in Patent Document 1 are described below by referring to FIG. 1. A substitute computer (OBU) 101 is set between an IC card (ICC) 100 and a server computer (RSE) 102. The substitute computer 101 and IC card 100 hold authenticating cipher keys Ki 110 and 111, respectively. The IC card 100 holds substitute information 113 as the information necessary for execution of a business-service server program 118 of a server 102. In the traffic-charge receiving system of the prior application, the business processing executed by a server computer is an authentication process.

First, the substitute computer 101 authenticates the IC card by using the common authenticating information items Ki 110 and 111 (step 112). When authentication is successful, the IC card 100 transfers the substitute information 113 with the server computer held by the IC card to the substitute computer 101 (step 114). The substitute computer 101 starts a business-service client program (APCL) 115 on the computer 101, exchanges information with a business-service server program 118 on the server computer 102, and executes a business processing conforming to a client-server format (step 117). In this method, when the substitute computer 101 has a performance higher than the IC card 100, it is possible to improve the whole processing performance.

In Patent Document 1, keeping the concealment of the data stored in a memory card at an automatic ticket gate is not disclosed. Also in Patent Document 4, preventing individual information from leaking when an unspecified number of persons use the information due is not disclosed.

SUMMARY OF THE INVENTION

It is an object of the present invention to provide a high-speed service by substituting IC card functions with an information kiosk terminal used by an unspecified number of persons. It is another object of the present invention to prevent individual information from leaking due to the fact that the individual information is output to an object other than an IC card or used by an unspecified number of persons. It is still another object of the present invention to make it possible to execute the card service same as for a microprocessor card and prevent individual information from leaking.

Moreover, it is still another object of the present invention to prevent the speed of authentication processing from lowering due to the fact that the number of data storage areas of an authentication key excessively increases as the number of users increases when authenticating a substitute computer by a common authentication key.

It is still another object of the present invention to prevent the speed of authentication processing from lowering due to the fact that the number of data storage areas is excessively increased the same as the above mentioned. This increase is because the number of users of the valid or invalid information showing whether the authentication information in an IC card is valid or invalid increases.

A typical invention among inventions disclosed in this application is briefly described below.

A substitute server computer in a computer system for executing the client-server-type business processing is used in which an IC card reader/writer connected with an IC card having business executing information used to execute the client processing part of the business processing and a first mutual authentication key, a tamper-resistant HSM, and a control computer connected to the IC card, the HSM, a business server for executing the server processing part of the business processing, and an authentication server computer having a second mutual authentication key are included, the HSM receives a first session encryption key generated from the authentication server by using the IC card and first and second mutual authentication keys and thereby performing mutual authentication, establishes a first secure channel extending to the IC card by using a second session encryption key generated at the time of the mutual authentication from the IC card and the received first session encryption key, receives the business executing data from the IC card, establishes a second secure channel by using the business server receiving the first session encryption key and the first session encryption key, and performs a predetermined business processing by using the HSM, the business server computer, and the business executing data.

The above configuration makes it possible to provide a high-seed service by substituting IC card functions with an information kiosk terminal used by an unspecified number of persons and moreover, prevent individual information from leaking due to the fact that the individual information is output to an object other than an IC card or used by an unspecified number of persons.

According to the present invention, it is possible to efficiently and securely substitute business processing with a substitute server computer instead of an IC card having a low calculation speed by using an authentication processing result of an authentication server computer.

The invention encompasses other embodiments of a method, an apparatus, and a system, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 7 is an illustration showing a configuration of a charging system to which a substitute processing system of the present invention is applied.

DETAILED DESCRIPTION OF THE PREFERRED EMBODIMENTS

An information service system, according to the present invention, uses a hardware security module (HSM) serving as an operation module having a tamper resistance as a client and being superior in operation processing and input/output processing. Mutual authentication is performed between a server, an IC card, and the HSM. Necessary information is delivered such as individual information necessary from the IC card to the HSM. And a service is started while keeping the secrecy of the IC card using the HSM as a substitute for the IC card. When the service is completed, the information is returned to the IC card from the HSM.

The necessary information delivered from an IC card to a HSM may be referred to as business executing data and individual information. This necessary information may include full name, age, sex, weight, taste, individual information, coupon information, value of electronic money, and information requiring secrecy.

Numerous specific details are set forth in order to provide a thorough understanding of the present invention. It will be understood, however, to one skilled in the art, that the present invention may be practiced with other specific details.

First Embodiment

Figure 1:
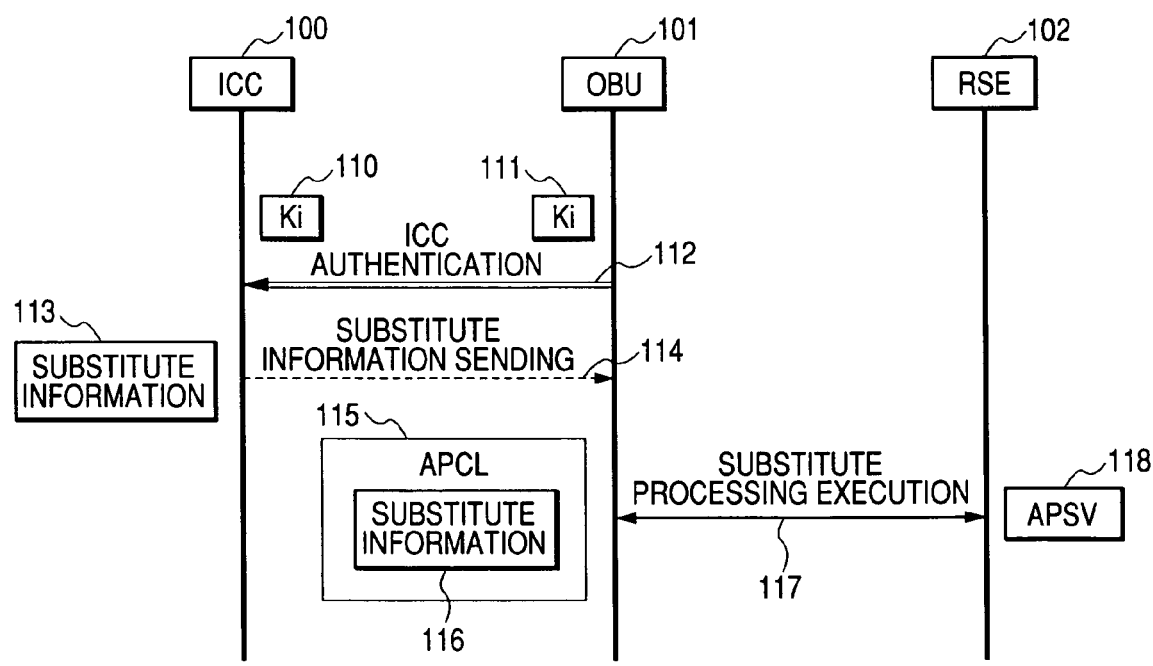
FIG. 1 is an illustration showing a substitute execution system of a conventional IC card system.
Figure 2:
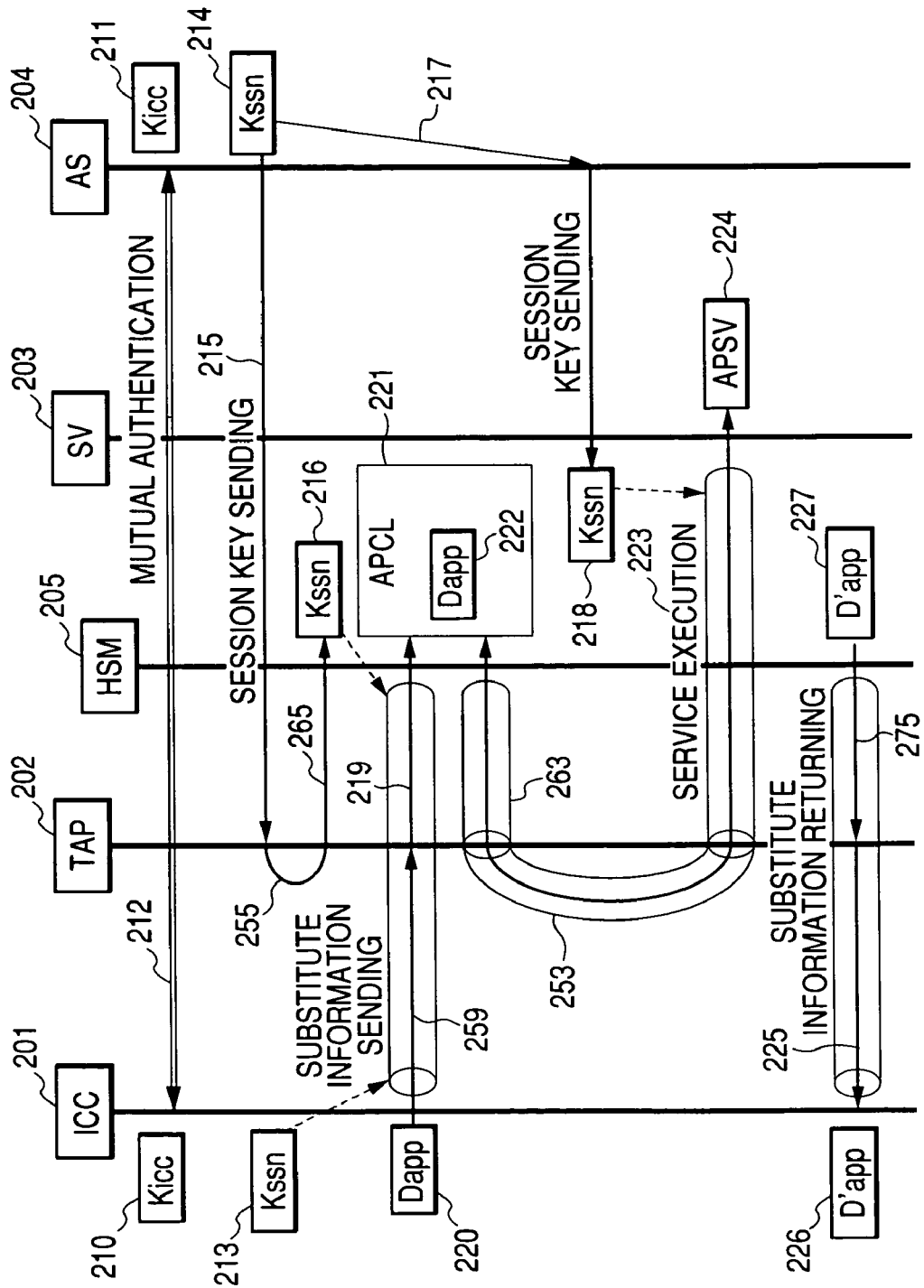
FIG. 2 is an illustration showing a substitute processing method of a first embodiment of the present invention.

FIG. 2 is an illustration showing a substitute processing method of a first embodiment of the present invention. An IC card system of this embodiment is composed of an IC card (ICC) 201, a substitute server computer (TAP) 202, a business server computer (SV) 203, and an authentication server computer (AS) 204.

The IC card 201 is a memory card or microprocessor card composed of a CPU, memory, and communication processing section.

The substitute server computer 202, business server computer 203, and authentication server computer 204 are normal computers which are mutually connected by a communication route to exchange information.

The IC card 201, substitute server computer 202, business server computer 203, and authentication server computer 204 form a computer system for executing a client-server-type business processing. A service such as an electronic money service using the IC card of this invention is realized by a client-server-type computer program. The server part of the program serves as a business server program which is executed by the business server computer 203. The client part of this program serves as a business client program which is executed by the IC card 201 or substitute server computer 202. The substitute server computer 202 has a built-in computer having a tamper resistance referred to as a hardware security module (HSM) 205 and moreover has a control computer for transferring data to and from the IC card, business server computer 203, authentication server computer 204, and HSM 205 separately from the HSM 205.

The substitute server computer has the built-in control computer and HSM 205 as described above. However, in the subsequent description, the substitute server computer 202 is described separately from the HSM 205 by assuming that the computer 202 shows a part other than the control computer or the HSM 205 of an IC card reader/writer.

The tamper resistance of the HSM of this invention typically denotes one of the physical tamper resistance pointing a mechanism withstanding an attack, the tamper resistance to a side channel attack against an object having a function for preventing the information useful for estimation of internal secret information from leaking to the outside, and the tamper resistance for preventing internal secret information from leaking by forcibly causing a malfunction from the outside. However, the tamper resistance of the HSM is not restricted to the above tamper resistances. The physical tamper resistance is realized by using a mechanism for making the analysis of an object (such as device, circuit board, or semiconductor component) difficult, preventing an object from operating when it is attempted to disassemble the object by detecting disassembly of the object by any method, or positively deleting secret information before the information leaks to the outside. The tamper resistance to a side channel attach denotes a temper characteristic for a technique for, in a device (circuit board or semiconductor integrated circuit), estimating secret information in a device by measuring the dependency of a cipher processing time on data (or secret information) and consumed current change/leakage electromagnetic wave under cipher operation and using a statistical procedure if necessary.

The IC card 201 and substitute server computer 202 are connected each other through an IC card reader/writer connected to an input/output channel of the substitute server computer 202 to exchange data. Moreover, the substitute server computer 202 is connected to the business server computer 203 and authentication server computer 204 through a network and leased line.

Therefore, the IC card 201 is connected to the business server computer 203, authentication server computer 204, and HSM 205 through the substitute server computer 202. The HSM 205 is also connected to the business server computer 203, authentication server computer 204, and IC card 201 through the substitute server computer 202.

The authentication server computer 204 is set to a data center and operated by a businessman for providing authentication services. The business server computer 203 is set to a data center and operated by a businessman for executing the business services. The substitute server computer 202 is set to a street or public space and operated by a businessman for providing business services or a third-party businessman by assuming an information kiosk.

Then, operations of this embodiment are described below. The IC card 201 previously holds a mutual authentication key (Kicc) 210 and business executing data (Dapp) 220 serving as the substitute information used for business execution of the client processing part of business processing. The HSM 205 in the substitute server computer 202 holds a business client program (APCL) 221 in order to substitution ally execute the client processing part using the business executing information 220 held by the IC card 201. The business server computer 203 holds a business server program (APSV) 224 in order to execute the server processing part of the business processing. The authentication server computer 204 previously holds a mutual authentication key (Kicc) 211 of the IC card 201 in order to authenticate the IC card 201.

First, the IC card 201 accesses the authentication server 204 via the substitute server computer 202. The both execute mutual authentication by using the mutual authentication keys Kicc 210 and 211 (step 212). When the mutual authentication is successful, the IC card 201 authentication server 204 respectively generate a session encryption key serving as a temporary cipher key. Specifically, the IC card 201 generates and holds a session encryption key (Kssn) 213 while the authentication server 204 generates and holds a session encryption key (Kssn) 214.

A mutual authentication key and a session encryption key are described below. The mutual authentication key is a common cipher key used to confirm the mutual validity between different computers. The session encryption key is a common cipher key used to satisfy the secrecy or completeness of the information exchanged between different computers. In this embodiment, the session encryption key Kssn is generated by using a key derived algorithm by using random numbers exchanged when the IC card 201 and authentication server 204 execute a mutual authentication 212 and the mutual authentication key Kicc 210 as inputs.

Though a mutual authentication key and a session key use a common key cipher for embodiments of this invention, it is also possible to use a public key cipher.

The authentication server 204 transfers the session encryption key 214 to the substitute server computer 202 (step 217). The substitute server computer 202 relays the session encryption key 214 through a not-illustrated internal transfer program (step 255) and transfers the key 214 to the HSM 205 (step 265).

Moreover, the authentication server 204 sends the session encryption key 214 to the business server computer 203 (step 217). However, secure information transfer is performed through a leased line between the authentication server 204, HSM 205, and business server computer.

Thus, the session encryption key Kssn is shared by the ICC 201, HSM 205, and AS 204.

The IC card 201 establishes a safe communication route (secure channel) with the HSM 205 through the substitute server computer 202 (steps 259 and 219) using a session encryption key 213. In this case, the secure channel for signing on data and encryption can be established using a session key.

In this case, the HSM 205 establishes a secure channel using a session encryption key 216 sent from the authentication server computer 204. The IC card 201 transmits the business executing data (Dapp) 220 to the APCL 221 in the HSM 205 through the established secure channel 219 (step 222).

Then, the HSM 205 establishes a secure channel with the business server computer 203 through the substitute server computer 202 (steps 263, 253, and 223). In this case, the business server computer 203 establishes a secure channel by using a session encryption key 218 sent from the authentication server computer 204. The business client program 221 on he HSM 205 accesses a business server program (APSV) 224 in the business server computer 203 by using business executing data 222 through the established secure channel 222 to execute a predetermined business service.

The content of predetermined business service execution is described below in detail by using a payment process in an electronic money system as an example. The value of electronic money shown by business executing data 223 is transferred to the business server 203, subtracted in the business server program 224, and returned to the business client program 221 in the HSM 205 as an updated electronic money value (D'app) 227. Thus, business is executed at the server side by using the data in the HSM. When the APCL can execute a subtraction processing instruction as another case, the APSV 224 commands the APCL 221 to execute subtraction processing and subtracts the Dapp 222 in the APCL to set the D'app 227.

When the business processing is completed, the HSM 205 in the substitute server computer 202 returns the updated business executing data (D'app) 227 to the IC card 201 through the substitute server computer 202 (steps 275 and 225). Moreover, it is possible to hold the updated business executing data in the HSM 205 or delete the data. The ICC 201 stores the processed substitute information as D'app 226 to prepare for the next-time business execution.

When using a memory card having only a function for reading or writing data as an IC card 210, the server business program APSV must be a business server program using only a write/read function correspondingly to the memory card. In other words, a processor-type IC card capable of executing a program is purposed but a business server program for a card program to be executed on the IC card cannot be used.

As described for this embodiment, however, when the client program APCL 221 on the HSM 205 works as a substitute for an IC card, by installing a program having the same function as a card program into a processor-type IC card, it is possible to use a business server program corresponding to a processor card because even if the ICC 201 is a memory card, it is executed on a business server.

Moreover, because the transfer route of the business data 220 serving as the individual information in the IC card 201 to the substitute server computer is protected by a secure channel. It is thus possible that the HSM serving as a substitute for the IC card in the substitute server computer 202 can execute business together with the business function server 203 because the HSM has a tamper resistance and moreover, and that the HSM 205 can execute business while securing the security of the business executing data 220 because the HSM has a tamper resistance.

According to the present invention, it is possible to improve the operation capacity of the HSM 205 compared to that of an IC card because the operation capacity of the HSM is not restricted in size like the case of the IC card. Particularly, it is possible to perform database retrieval and coupon issuing according to the individual information in an IC card which cannot be made by the IC card 201 for which a high-speed operation cannot be expected at a high speed and prevent secrecy from being lost by outputting individual information to an object other than an IC card. Moreover, when retrieving the database, it is possible to use an input to the substitute server computer from a user and the use history of the substitute server computer in addition to the individual information.

Moreover, it is possible to store the business executing data values 222 and 227 of an unspecified number of users by sorting memory areas in the HSM.

Furthermore, by deleting the updated business executing data 227 from the HSM 205, secrecy is further enhanced because the business executing data values 222 and 227 serving as individual information are not present in the substitute server computer but the data values are present only in an IC card.

In the present invention, the authentication between the IC card 201 and authentication server computer 204 is performed and thereafter the authentication between the IC card 201 and HSM 205 is performed by using a session key 215 sent from the authentication server computer. Therefore, also when using common key encryption, a problem does not occur that the HSM 205 must hold authentication keys of all IC cards which may use the HSM 205. If the problem is present, authentication-key data storage areas are excessively increased as the total number of IC cards which may be used increases and the speed of the authentication processing of the HSM 205 is lowered.

Moreover, because the card 201 is invalid for theft or loss, it is necessary to make the card unusable even if the electronic operation of the card is normal.

Furthermore, it is possible that the authentication server computer 204 controls the valid/invalid information showing whether the authentication information of each IC card 201 is valid or invalid and checks the validity of the card when authenticating the IC card 201. Therefore, it is not necessary to control the information showing that the HSM 205 is valid or invalid. Therefore, a problem does not occur that as the number of IC cards which may be used increases, areas for storing the data for valid or invalid information are excessively increased and the processing speed of the HSM 205 lowers.

Second Embodiment

Figure 3:
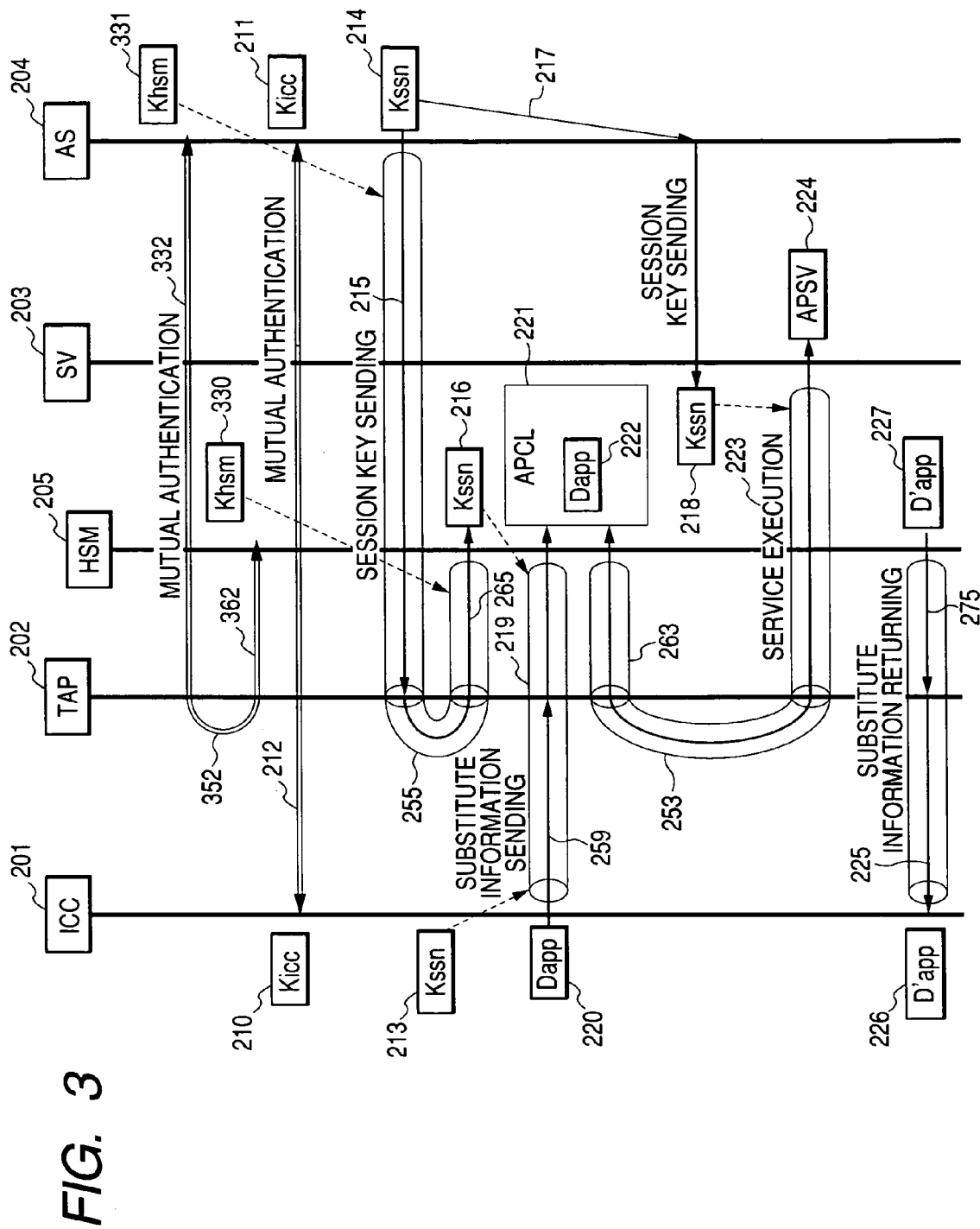
FIG. 3 is an illustration showing a substitute processing method of a second embodiment of the present invention.

A second embodiment of the present invention is described below by referring to FIG. 3. In this embodiment, only portions different from those of the first embodiment are described.

An HSM holds a mutual authentication key Khsm 330, an authentication server computer 304 holds a mutual authentication key Khsm 331 corresponding to the mutual authentication key Khsm 330, and mutual authentication is executed between an HSM 205 on a substitute server computer 302 and the authentication server computer 304 before the mutual authentication 312 between an IC card 301 and the authentication server computer 304 (steps 332, 352, and 362). A session encryption key Kssn 214 is sent from an AS 204 to the HSM 205 through secure channels 215, 255, and 265 established through the mutual authentication. Thereby, it is possible to safely transfer the session encryption keys.

In the above first embodiment, secure information transfer by a leased line is necessary between the AS 204 and HSM 205. The second embodiment shows that the same advantage as in the first embodiment can also be achieved for an ATP 202 connected to a public network by mutually authenticating the HSM 205 with the AS 204. Thus, the description of the second embodiment is completed.

In the second embodiment, it is not necessary to perform secure information transfer using a leased line between an authentication server 204, the HSM 205, and a business server computer.

Third Embodiment

Figure 4:
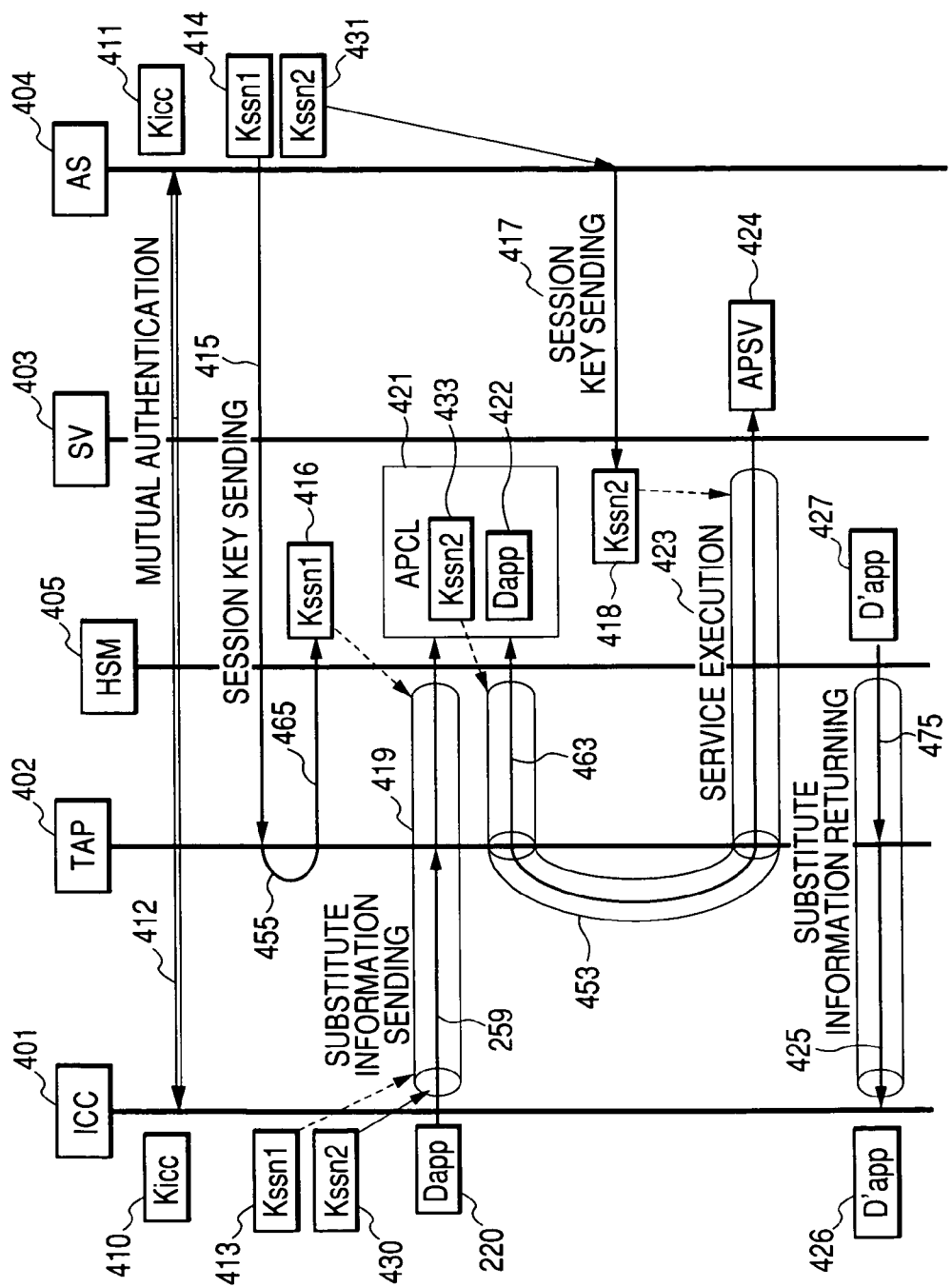
FIG. 4 is an illustration showing a substitute processing method of a third embodiment of the present invention.

A third embodiment of the present invention is described below by referring to FIG. 4. An IC card system in this embodiment is composed of an IC card (ICC) 401, a substitute server computer (TAP) 402, a business server computer (SV) 403, and an authentication server computer (AS) 404. Each server is a normal computer and the substitute server computer 402 has a hardware security module (HSM) 405, which conforms to the first embodiment. This embodiment is different from the first embodiment in method for each server to generate a mutual authentication key. Then, operations of this embodiment are described below.

The IC card 401 previously holds a mutual authentication key (Kicc) 410 and business executing data (Dapp) 420 used for business execution. The HSM 405 on the substitute server computer 402 holds a business client program 421. The business server computer 403 holds a business server program 424. The authentication server computer 404 previously holds a mutual authentication key (Kicc) 411 of the IC card 401. First, the IC card 401 accesses the authentication server 404 via the substitute server computer 402. The both execute mutual authentication by using the mutual authentication key Kicc 410 and a mutual authentication key Kicc 411 (step 412). When the mutual authentication is successful, the IC card 401 generates and holds a first session encryption key (Kssn1) 413 and a second session encryption key (Kssn2) 430 and the authentication server 404 generates and holds a first session encryption key (Kssn1) 414 and a second session encryption key (Kssn2) 431.

The authentication server 404 sends the first session encryption key 414 to the HSM 405 through the substitute server computer 402 (steps 415, 455, and 465). Moreover, the authentication server 404 sends the second session encryption key 431 to the business server computer 403 (step 417).

The IC card 201 establishes a safe communication route (secure channel) together with the HSM 405 through the substitute server computer 402 by using the first session encryption key 413 (steps 459 and 419). In this case, the HSM 405 on the substitute server computer 402 uses a first session encryption key 416 sent from the authentication server computer 404. The IC card 401 sends the second session encryption key 430 and business executing data (Dapp) 420 to the business client program 421 on the HSM 405 through an established secure channel 419 and the substitute server computer 402 (step 421).

The HSM 405 establishes a safe communication route (secure channel) together with the business server computer 403 by using a second session encryption key 433 (steps 463, 453, and 423). In this case, the business server computer 403 establishes a secure channel by using a second session encryption key 418 sent from the authentication server computer 404. The business client program 421 on the HSM 405 accesses the business server program (APSV) 424 on the business server computer 203 through an established secure channel 422 by using the business executing data 422 to execute a predetermined business service.

As described above, In this embodiment, the ICC 401 and AS 404 generate two different session encryption keys Kssn1 and Kssn2. The session encryption key Kssn1 is used for the mutual authentication between the ICC 401 and HSM 405 and the session encryption key Kssn2 is used for the mutual authentication between the SV 403 and HSM 405. Because the first embodiment uses a single session encryption key, the possibility is considered that the HSM 205 can access the business server 203 before receiving the business executing information Dapp 220. However, in this embodiment, the prepared two session encryption keys prevent the HSM 405 from independently accessing the business server 403, and security is thus improved.

Fourth Embodiment

Figure 5:
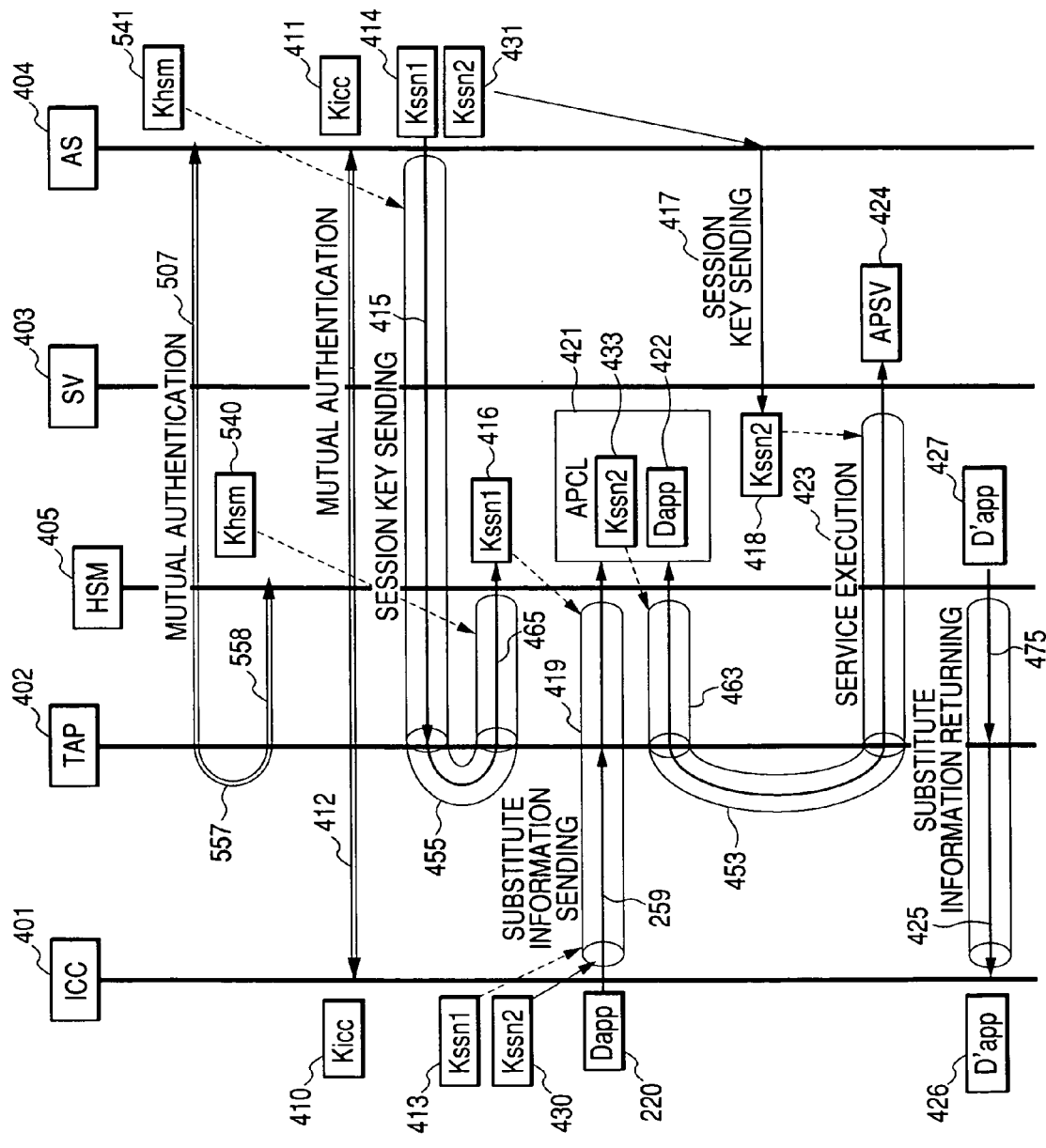
FIG. 5 is an illustration showing a substitute processing of a fourth embodiment of the present invention.

A fourth embodiment of the present invention is described below by referring to FIG. 5. Only portions different from the first embodiment are described in this embodiment.

First, an HSM 405 on a substitute server computer 502 holds a mutual authentication key Khsm 540 and an authentication server computer 404 holds a mutual authentication key Khsm 541.

Before starting the mutual authentication 412 between an IC card 401 and the authentication server computer 404, the mutual authentication between the HSM 405 on a substitute server computer 402 and the authentication server computer 404 is executed (steps 507, 557, and 558). A session encryption key Kssn 214 is sent from an AS 204 to an HSM 205 through secure channels 215, 255, and 265.

The third embodiment requires secure information transfer using a leased line between the AS 404 and HSM 405. The fourth embodiment, however, shows that the same advantage as the third embodiment is also achieved for a TAP 402 connected to a public network by performing the mutual authentication between the HSM 405 and an AS 404.

Fifth Embodiment

Figure 6:
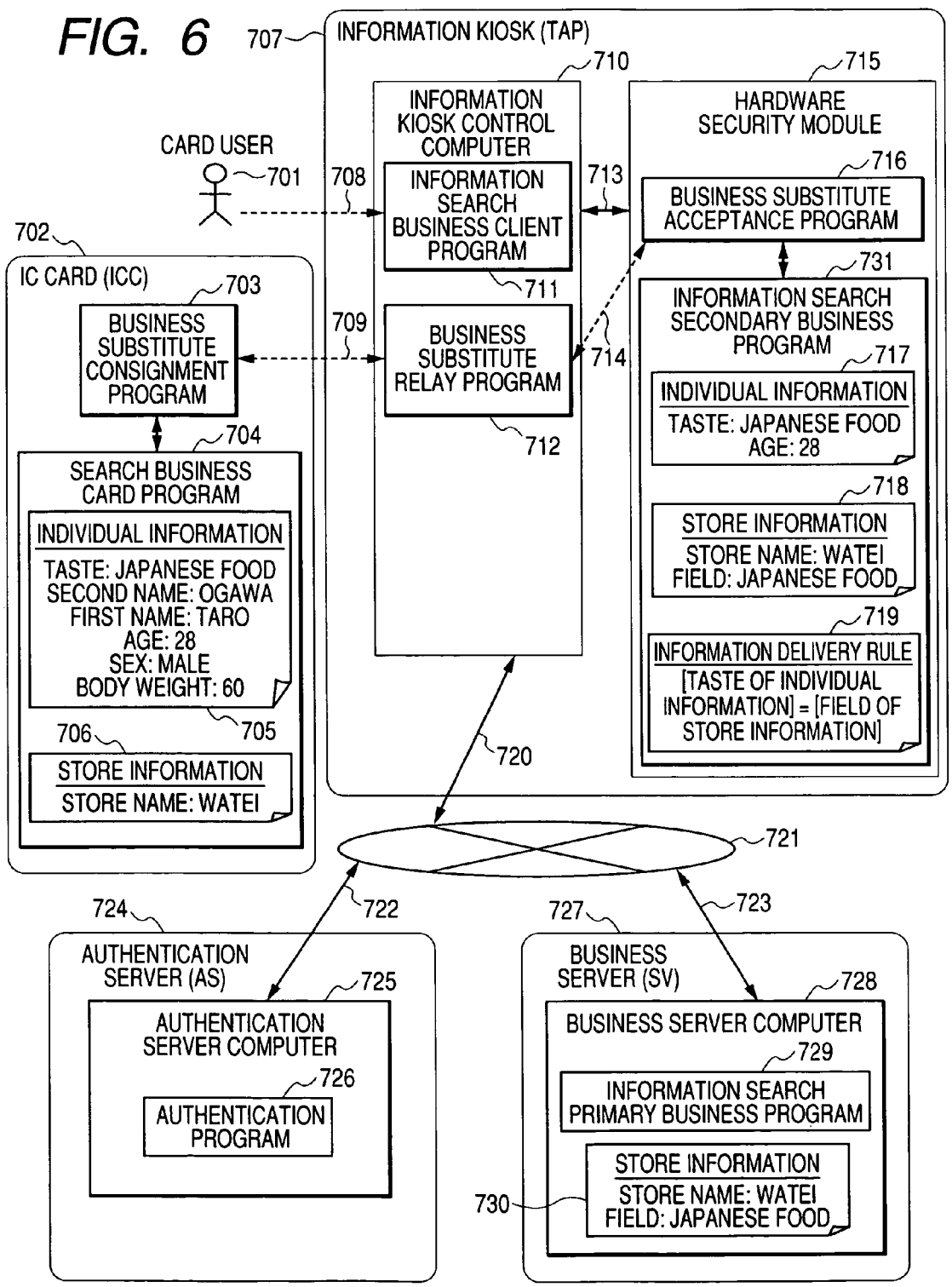
FIG. 6 is an illustration showing a configuration of an information retrieval system to which a substitute processing system of the present invention is applied.

A fifth embodiment of the present invention is described below by referring to FIG. 6. FIG. 6 shows an information retrieval system to which the substitute processing system described for the embodiments 1 to 4 of the present invention is applied. This system is composed of a card user 701, IC card 702, substitute server computer (information kiosk) 707, network 721, business server computer (business server) 727, and authentication server computer (authentication server) 724.

The information kiosk 707 is composed of an information kiosk control computer 710 and hardware security module (HSM) 715 having a tamper resistance. The information kiosk control computer 710 has a function for executing input/output with the card user 701 and network 721, which corresponds to the substitute server computers (TAP) 202 and 402 described for the embodiments 1 to 4 of the present invention. The hardware security module (HSM) 715 having a tamper resistance corresponds to hardware security modules (HSM) 205 and 405 described for the embodiments 1 to 4 of the present invention. The IC card 702 corresponds to the IC cards (ICC) 201 and 401 described for the embodiments 1 to 4 of the present invention. The authentication server (AS) 724 is composed of an authentication server computer 725 and corresponds to the authentication servers (AS) 204 and 404 described for the embodiments 1 to 4 of the present invention. The business server (SV) 727 is composed of a business server computer 729 and corresponds to the business servers (SV) 203 and 403 described for the embodiments 1 to 4 of the present invention.

A flow of the first embodiment for the information retrieval processing using the present system is described below. First, the card user 701 uses the IC card 702 to log in the server computer 707. The card user inputs a retrieval condition of a restaurant to be retrieved by the user (such as positional information of the restaurant) to an information search business client program 711 of the information kiosk control computer 710. The information search business client program 711 accesses the business server 727 through the network 721 to send the positional information on the restaurant which is the retrieval condition to an information search primary business program 729 on the business server computer 728. The information search primary business program 729 refers to, for example, a database on the business server computer to obtain retrieval result information 730. The retrieval result information 730 is sent to the information kiosk control computer 710 through the network 721 and stored in an information search secondary business program 731 in the HSM 715 as store information 718.

A business substitute consignment program 703 in the IC card 702 executes the mutual authentication with an authentication program 726 in the authentication server computer 725 on the authentication server 724 (steps 212 and 412). As a result, the business substitute consignment program 703 and authentication program 726 generate session encryption key information items (213, 214, 413, 430, 414, and 431). The authentication program 726 sends the generated session encryption key information items to a business substitute acceptance program 716 in the HSM 715 (steps 255, 265, 455, and 465).

The business substitute consignment program 703 on the IC card 702 establishes the business substitute acceptance program 716 on the HSM 715 and a secure channel through a business substitute relay program 712 on the information kiosk control computer 710 (steps 259 and 219). Individual information 705 in a search business card program 704 in the IC card 702 is sent to the information search secondary program 731 in the HSM 715 through the secure channel and stored as individual information 717 (steps 222 and 422).

The information search secondary program 731 executes the matching between the individual information 717 and store information 718 in accordance with information delivery rule 719 of the program 731. In this example, because the "taste of the individual information 717" coincides with the "field of the store information 718", matching is effected (steps 263, 253, 223, 463, 453, and 423), and store information is sent to the IC card 702 and stored as store information 706 (steps 225 and 275).

Thus, according to the present invention, the individual information 705 stored in the IC card 702 is transferred to only the HSM 715, held and stored as the individual information 717, and matching is executed. That is, because the privacy information 705 does not leak to a system other than the IC card 702 having a tamper resistance and the HSM 715, the privacy of the card user 701 is protected. Moreover, there is an advantage that retrieval processing which is a business service is executed by the HSM having a high throughput compared to the IC card and can be accelerated.

Sixth Embodiment

A sixth embodiment of the present invention is described below by referring to FIG. 7. This embodiment describes only points different from those of the first embodiment.

A charging program APHSMCHRG 611 for charging a user of an IC card in accordance with the utilization time of the substitute processing service of the HSM 205 is prepared on the HSM 205. When the APCL 211 operates, start of charging is designated to the charging program APHSM-CHRG 611 through a path 610. When the substitute processing is completed and an APCL 612 returns the D'app 227 to the ICC 201, end of charging is designated to an APHSMCHRG 614 through a path 613. The APHSMCHRG 614 calculates the mount of money in accordance with a not-illustrated charging program. The calculation result is stored in a charging program APCLCHRG 617 of the ICC 201 as charging information (step 614).

According to this embodiment, it is possible to charge for utilization in accordance with the time using the substitute server 202, communication frequency, or transferred data quantity and a rental-type business model is realized.

The invention made by the present inventor is specifically described above in accordance with embodiments. However, the present invention is not restricted to the above embodiments. It is needless to say that various modifications of the present invention are allowed as long as the modifications are not deviated from the gist of the present invention. For example, it is also possible to provide the same function as that of an IC card of this invention for a mobile terminal such as a cellular phone or PDA to serve as a substitute for the IC card of this invention.

What is claimed is:

1. A substitute server computer used for a computer system for executing client-server-type business processing, the substitute server computer comprising:
   an integrated circuit card reader/writer connected to an IC card having business executing information used for execution of a client processing part of the client-server-type business processing and having first mutual authentication key;
   a hardware security module having a tamper resistance; and
   a control computer connected to the integrated circuit card, the hardware security module, a business server computer for executing the server processing part of the business processing, and an authentication server computer having a second mutual authentication key, wherein the hardware security module is configured to receive a first session encryption key generated by using the first and second mutual authentication keys and by performing the mutual authentication with the IC card from the authentication server, to establish a first secure channel between the hardware security module and the integrated circuit card by using a second session encryption key generated from the integrated circuit card when performing the mutual authentication and from the received first session encryption key, to receive the business executing data from the IC card, to establish a second secure channel by using the business server receiving the first session encryption key and the second session encryption key, and to perform predetermined business processing with the hardware security module and the business server computer by using the business executing data,
   wherein the hardware security module has a third mutual authentication key and is further configured to perform mutual authentication with the authentication server by using the third mutual authentication key and a fourth mutual authentication key of the authentication server computer to establish a third secure channel before the mutual authentication between the integrated circuit card and the authentication server computer, and to receive a first session encryption key from the authentication server through the third secure channel.

2. The substitute server computer of claim 1, wherein the hardware security module is further configured to return the business executing data updated through the business processing to an integrated circuit card through the first secure channel and to delete the business executing data from the hardware security module.

3. The substitute server computer of claim 1, wherein the business executing data is data having secrecy.

4. The substitute server computer of claim 1, wherein the hardware security module if further configured to perform retrieval coinciding with a retrieval condition to be input to the substitute server computer by a user in accordance with the retrieval condition and the business executing information having secrecy.

5. The substitute server computer of claim 1, wherein the substitute server computer charges a user in accordance with a using time of the user.

6. The substitute server computer of claim 1, wherein the substitute server computer is connected to the authentication server computer through a network.

7. A method for executing client-server-type business processing, the method comprising:
   executing via an integrated circuit card client a processing part of business processing and a first mutual authentication key for mutual authentication, wherein the integrated circuit card has business executing information used for the executing;

executing via a business server computer a server processing part of the business processing;

authenticating via an authentication server computer a second mutual authentication key to authenticate the integrated circuit card;

executing via a substitute computer a client processing part using the business executing information, wherein the substitute computer includes a hardware security module having a tamper resistance, the hardware security module having a third mutual authentication key;

applying mutual authentication to the integrated circuit card and the authentication server with the first and second mutual authentication keys;

generating via the integrated circuit card a first session encryption key;

generating via the authentication server a second session encryption key corresponding to the first session encryption key when the mutual authentication is successful;

sending via the authentication server the second session encryption key to the hardware security module and the business server computer through the substitute server computer;

establishing via the integrated circuit card and at the hardware security module a safe communication route through the substitute server computer by using the first and second session encryption keys;

sending via the integrated circuit card business executing data to the hardware security module through the communication route;

establishing via the hardware security module and at the business server computer a safe second communication route through a substitute server computer by using a second session encryption key;

accessing via the hardware security module the business server computer to execute a predetermined business service;

returning via the hardware security module the business executing data updated through the business service to the integrated circuit card through the first communication route to delete the data from the hardware security module;

performing via the hardware security module mutual authentication with the authentication server by using the third mutual authentication and a fourth mutual authentication key of the authentication server computer to establish a third secure channel before the mutual authentication between the integrated circuit card and the authentication server computer; and receiving via the hardware security module a first session encryption key from the authentication server through the third secure channel.

8. The method of claim 7, further comprising:

returning via the hardware security module the business executing data updated through the business processing to an integrated circuit card through the first secure channel; and deleting via the hardware security module the business executing data from the hardware security module.

9. The method of claim 7, wherein the business executing data is data having secrecy.

10. The method of claim 7, further comprising performing via the hardware security module retrieval coinciding with a retrieval condition to be input to the substitute server computer by a user in accordance with the retrieval condition and the business executing information having secrecy.

11. The method of claim 7, further comprising charging via the substitute server computer a user in accordance with the using time of the user.

12. The method of claim 7, wherein the substitute server computer is connected to the authentication server computer through a network.

* * * * *